July 30, 1963  R. WEISS ETAL  3,099,194
EXPOSURE REGULATING MEANS FOR CAMERAS
Filed May 23, 1961  2 Sheets-Sheet 1

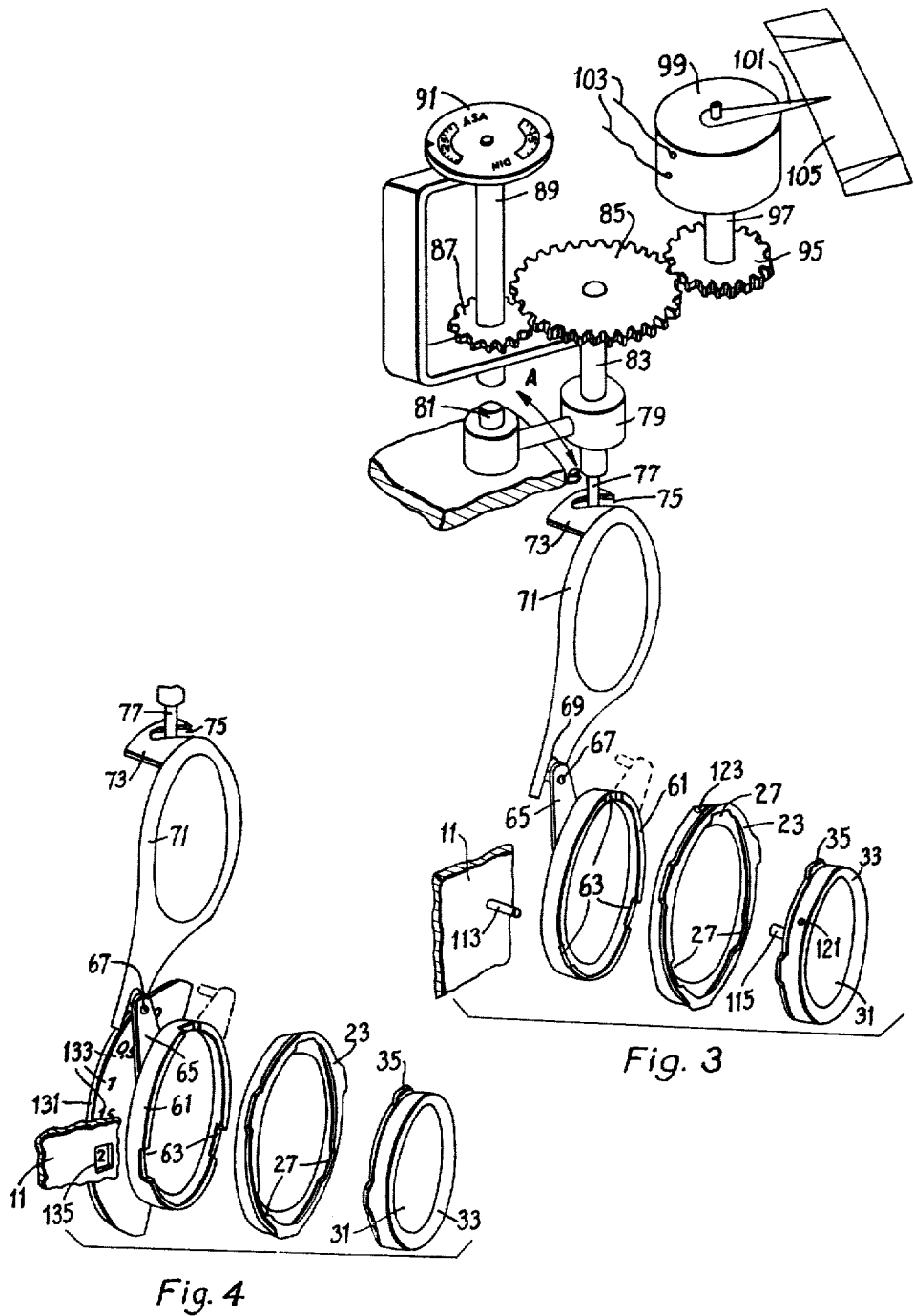

United States Patent Office 3,099,194
Patented July 30, 1963

3,099,194
EXPOSURE REGULATING MEANS FOR
CAMERAS
Richard Weiss and Claus Prochnow, Braunschweig, Germany, assignors to Franke & Heidecke, Fabrik Photographischer Prazisions-Apparte, Braunschweig, Germany, a firm of Germany
Filed May 23, 1961, Ser. No. 111,994
Claims priority, application Germany June 1, 1960
12 Claims. (Cl. 95—10)

This invention relates to regulating or adjusting the exposure of a photographic camera, and more particularly to the effect of the filter factor on the exposure.

An object of the invention is the provision of generally improved and more satisfactory exposure regulating or adjusting means which takes into account the filter factor.

Another object of the invention is the provision of means for automatically varying the exposure in accordance with the proper filter factor, when a filter is used.

Still another object is the provision of means for introducing a filter factor into the exposure regulating or adjusting mechanism, when a filter is applied to the camera, and means for automatically eliminating this filter factor when the filter is removed from the camera, so that the operator will not forget to readjust the exposure when he removes the filter.

A further object is the provision of simple and inexpensive constructions for accomplishing the above objects in a practical way.

These and other desirable objects may be attained in the manner disclosed as an illustrative embodiment of the invention in the following description and in the accompanying drawings forming a part hereof, in which:

FIG. 3 is a similar view illustrating another form of the invention; and

FIG. 4 is a similar view illustrating still another form of the invention, which at present constitutes the preferred form thereof.

While many features of the invention are applicable to different kinds or types of cameras, the invention is here disclosed by way of example in connection with a twin lens reflex camera such as the "Rolleiflex" camera manufactured by the firm of Franke & Heidecke in Braunschweig, Germany, and well known and widely used throughout the United States and elsewhere.

Figure 1:
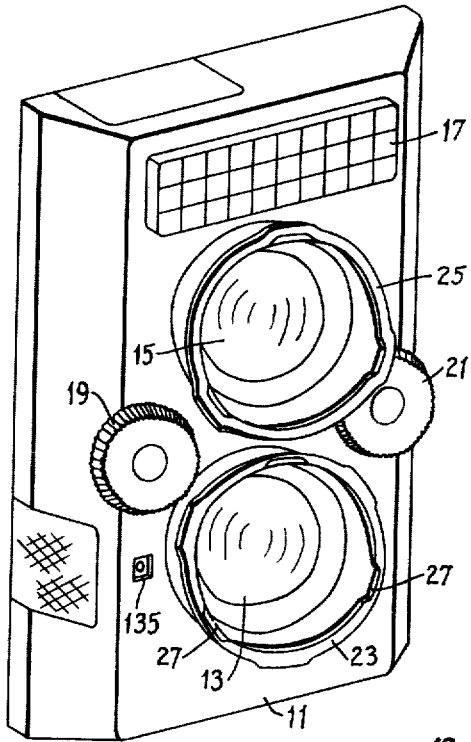
FIG. 1 is a perspective view of the front portion only of a camera, in accordance with an embodiment of the present invention.

Only the front portion of a typical camera is shown in FIG. 1, and is indicated in general at 11. It has a lower picture taking or exposure lens 13, and an upper finder lens or focusing lens 15, and above the latter it has a built-in exposure meter or light meter, the photoelectric cell of which is indicated diagrammatically at 17. Adjusting knobs for making various adjustments are shown at 19 and 21, but these are not important for purposes of the present invention and need not be further described.

The camera with which the present invention is used, in common with most twin lens reflex cameras, has a conventional form of bayonet mount surrounding each of the lens 13 and 15, the bayonet mount for the lower lens 13 being indicated at 23 and the bayonet mount for the upper lens 15 being indicated at 25. The bayonet mounts are not necessarily identical with each other, but may be, if desired. Each mount includes a plurality of conventional recesses 27 spaced from each other circumferentially in the usual way, so that when an accessory unit or article (e.g., a supplementary lens, a sun shade, or a filter) is to be mounted on the bayonet mount, the projecting lugs on the accessory are inserted in an axial direction through the recesses 27, and then the entire accessory is turned through a fraction of a revolution about the axis of the lens as a center, so that the projections come behind circumferential flanges on the bayonet mount, and are retained thereby. The mounting and removal of accessories, by the use of bayonet mounts of this kind, is well understood in the art.

It is also well known in the art that the use of a filter when taking a picture usually requires an increased exposure, as compared with taking the same picture under the same illumination conditions without the use of a filter. The amount by which the exposure must be increased is usually referred to as the filter factor. If a given filter has a factor of 2, an exposure made through this filter must have twice the exposure value, as compared with an exposure made under identical illumination conditions but without the filter. Similarly, if a darker filter having a filter factor of 3 is used, three times the exposure must be given. Filter factors are not necessarily whole numbers; frequently there may be, for example, a filter factor of 1.5, or 2.5, etc. All of this is well understood in the art. Experienced photographers are also aware that when the exposure must be increased on account of the use of a filter, this can be done by increasing the length of the exposure (using a slower shutter speed), or by increasing the effective diameter of the diaphragm aperture, or by a combination of these two things.

When a filter is placed on the camera, it is very easy to forget to allow for the filter factor when setting the camera for the next exposure. When allowance for the filter factor is not made, the resulting picture will be under exposed. Even if one does remember to allow for the filter factor when placing a filter on the camera, it is also very easy to forget that the filter factor allowance must be eliminated when the filter is taken off of the camera. If the next exposure is made without a filter, but without changing the setting to take into account the removal of the filter, this will result in an over exposed picture.

These undesirable results of forgetfulness are eliminated by the present invention. In one of the described forms of the present invention, the correct filter factor is automatically introduced into the exposure controlling mechanism by the act of mounting or placing the filter on the camera. In another described form of the invention, the filter factor is automatically introduced into the mechanism by the act of placing the filter on the camera and turning or twisting it to the proper extent, but it is left to the intelligence of the operator to govern the correct extent or degree of filter factor introduced into the mechanism. In all described forms of the invention, the filter factor is completely eliminated automatically from the adjusting mechanism, when the filter is removed from the camera, so that whatever filter factor has been introduced into the adjusting mechanism when the filter was placed on the camera, whether it be the correct filter factor or not, it is in either event completely eliminated when the filter is removed.

Figure 2:
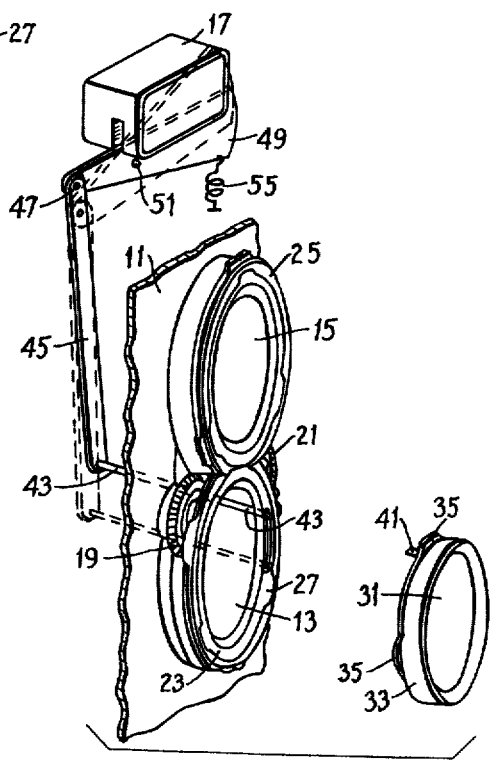
FIG. 2 is an exploded perspective view of certain parts at the front of the camera, with other parts broken away, illustrating one form of the present invention, the showing being somewhat diagrammatic.

Referring now to the embodiment of the invention illustrated somewhat diagrammatically or schematically in FIG. 2, the filter 31 is mounted in a mounting ring 33 provided with radially extending and circumferentially spaced bayonet lugs or projections 35 which, in the customary manner, can pass through the previously mentioned notches 27 of the bayonet mount 23, after which the filter mount may be turned a fraction of a revolution to bring the projections 35 out of alinement with the notches 27 and bring them to positions behind the circumferential flanges of the bayonet mount on the camera. This much is conventional.

According to this form of the invention, the filter mount 33 is provided with a pin 41 secured in fixed position on the mount 33 and projecting a slight distance rearwardly. When the mounting ring 33 is turned in the bayonet mount 23, the pin 41 on the filter mount engages with a pin 43 mounted for guided movement in the front portion 11 of the camera, and pulls downwardly on this pin as the rotation of the filter mount continues, thereby pulling downwardly on the link 45 to which the pin 43 is rigidly secured. The upper end of the link 45 is pivoted at 47 to a masking member or shutter member 49 which is pivoted at 51 in position so that, when the link 45 is pulled downwardly, the masking member 49 will rise upwardly partly across the face of the photoelectric cell 17, cutting off part of the light which would otherwise reach this photoelectric cell.

In this first form of the invention as illustrated in FIG. 2, there is a conventional stop (not shown) which limits the rotation of the filter mount 33, and the user, when applying the filter to the camera, rotates or twists the mount 33 to the maximum extent possible. In this form of the invention, the pin 41 is placed on the filter mount 33 at a variable position, depending upon the filter factor of the particular filter 31. The larger the filter factor, the further around the pin 41 will be, in a clockwise direction when viewed from the front as in FIG. 2. For a filter of lower or smaller filter factor, the pin 41 will be placed in a more counterclockwise position. Therefore, when the filter mount is turned through the standard rotary extent (until it engages the fixed stop and can turn no further) the amount of displacement of the pin 43 by contact with the pin 41 will depend on the position of this pin 41 on the filter mount, which position, in turn, depends upon the filter factor of the particular filter. The parts are so proportioned that if the filter has a factor of 2, for example, its pin 41 will displace the pin 43 and link 45 sufficiently far so that the mask 49 will cover approximately one-half of the area of the photoelectric cell 17, thereby reducing to one-half the amount of light falling on the cell, thus in effect adjusting the light meter or exposure meter to make allowance for a filter factor of 2. Likewise if the filter has, for example, a factor of 3, then the pin 41 of this filter will be so placed that when the filter has been turned to its proper position, the mask 49 will cover approximately two-thirds of the area of the photo cell 17, so that the light meter or exposure meter will be responsive to only one-third of the light, thereby automatically introducing into the computation a filter factor of 3. Similarly for other filters with other filter factors, the pin 41 on the filter mount in each case will be placed in such a position that when the filter is properly applied to the camera and twisted as far as it will go, it will operate the mask 49 to the desired extent to introduce the proper filter factor adjustment or allowance into the light meter. It is immaterial whether the light meter is then read visually by the operator and used by the operator for manual setting of the exposure value, or whether the exposure meter automatically controls the exposure value to which the camera is automatically set, as known in the art and as shown, for example, in United States Patent 2,969,004 of Gebele, granted January 24, 1961.

When the filter is removed from the camera, the pressure of the pin 41 on the pin 43 is removed and a suitable spring 55 swings the mask 49 to its normal open position where it no longer covers any portion of the photo cell 17. Thereby the filter factor adjustment or allowance is eliminated, and there is no danger of the operator forgetting to reset the exposure mechanism to eliminate the filter factor when he takes the filter off of the camera.

In the first form of the invention, described in connection with FIG. 2, the filter is turned through a predetermined angle when it is applied to the camera, all filters being turned through the same angle regardless of differences in filter factor. In a second embodiment of the invention, now to be described in connection with FIG. 3, the filter is turned through a variable angle when applying it to the camera, filters with larger filter factors being turned or twisted through larger angles than those having smaller filter factors. The turning of the filter through a variable angle depending on filter factor is possible because, in the typical bayonet mount, there are three bayonet lugs 35 equally spaced in a circumferential direction, and the filter can be attached to the camera by turning or twisting it through any desired angle from a minimum of a few degrees just sufficient to catch the lugs 35 behind the retaining flanges on the camera, to a maximum turn or twist bringing each of the lugs 35 around almost but not quite to the next notch 27 in the mount on the camera. In practice, the variation from minimum required turn to maximum permissible turn of the filter is about 90 degrees, and so there is a considerable range of positions of orientation which the filter may assume and yet be firmly and properly fastened to the bayonet mount on the camera. In this second embodiment of the invention now to be described in connection with FIG. 3 advantage is taken of this possibility, and the filter factor introduced into the camera mechanism is dependent upon the degree to which the filter mount is turned in the bayonet mount on the camera.

Another difference between the embodiment of FIG. 3 and the embodiment of FIG. 2, is that in the embodiment described in connection with FIG. 2, a special pin or projection 41 is used on the filter mount, to operate the filter factor mechanism on the camera. In FIG. 3, on the contrary, no special projection or pin is needed for this purpose on the filter mount, but rather the bayonet lugs themselves on the filter mount serve to actuate the mechanism on the camera which introduces the filter factor.

Referring now to FIG. 3, the filter 31 and its mount 33 and the lugs 35 on the latter may be the same as before, and are designated by the same reference numerals, the difference being in the elimination of the pin 41 which was present in the first embodiment. The portions 23 and 27 of the bayonet mount on the camera may also be the same as before, and are designated by the same numerals. However, in this embodiment, the bayonet mount on the camera has a coaxial ring 61 mounted for rotation about the optical axis of the picture taking lens, in a suitable space or recess within the mount 23, just behind the retaining flanges thereof. This rotary ring 61 has notches 63 in its front face, in position to receive the lugs 35 of the filter mount 33, when the filter mount is applied in the normal axial manner to the bayonet mount on the camera. When the filter mount is rotated or twisted after applying it axially to the camera, the engagement of the filter mount lugs 35 in the notches 63 of the ring 61 will cause the ring 61 to turn to the same extent that the filter mount turns.

The ring 61 carries an arm 65 having a pin 67, and this pin 67 is used to introduce the filter factor adjustment or allowance into the mechanism of the camera, in any suitable way. In the simplest form, the pin 67 may correspond functionally to the pin 43 in the embodiment illustrated in FIG. 2, and the motion of the pin 67 may be utilized to move a mask partly across the light-receiving opening of the photo cell of the light meter or exposure meter, as was done in FIG. 2. But the motion of this pin 67 may be utilized to introduce the filter factor in any other way, if desired.

For example, the pin 67 may engage in a radial slot or fork 69 on a ring 71 rotatable about the axis of the finder lens 15 (FIG. 1) and this ring 71 near its upper edge may carry a rearwardly extended flange 73 having an inclined cam slot 75 therein. The cam 75 may be utilized in any desired way to introduce the filter factor into the mechanism, as for example by having the cam slot control the position of a pin 77 which extends downwardly from a bracket 79 mounted to turn on a vertical pivot 81 on a fixed part of the camera. The upper part of the pin 77, above the bracket 79, constitutes a vertical shaft 83 on which is rotatably mounted a gear wheel 85 meshing with a gear 87 on a shaft 89 which is in axial alinement with the pivot 81. This shaft 89 carries at its upper end the setting knob 91 (manually accessible at the top of the camera) for setting the film speed or sensitivity in known manner, well understood in the art.

In addition to meshing with the gear 87, the gear 85 also meshes simultaneously with a gear 95 whose shaft 97 carries the body of the exposure meter 99, so that rotation of the gear 95 and shaft 97 will bodily rotate the entire exposure meter body 99 so that, for any particular position of the pointer 101 relative to the body 99 (depending upon the current produced by the photoelectric cell connected to the meter by the circuit wires 103) the position of the pointer 101 will be changed relative to the exposure meter scale plate indicated diagrammatically at 105. This feature of turning the entire measuring instrument portion of the exposure meter or light meter, in order to introduce an adjustment such as a film speed adjustment or a filter factor adjustment, is well known in the art and will be readily understood by those skilled in the art.

From the foregoing, it will be seen that when the filter mount is applied to the camera and twisted relative thereto in order to engage the bayonet lugs 35 behind the retaining flanges on the camera, this will cause a corresponding twist or rotation of the ring 61, which will likewise turn the ring 71, and the cam 75 will thereby cause the shaft 77, 83 of the gear 85 to swing about the pivot 81, in the direction of the arrow A—B, so that the gear 85 will rotate slightly on the stationary gear 87, and will cause rotation of the gear 95, to introduce the filter factor adjustment by turning the entire body 99 of the exposure indicating instrument. During this swinging adjustment of the gear 85, the center of this gear comes slightly closer to or farther away from the center of the gear 95, but the engagement of the teeth of the gears 85 and 95 with each other is sufficiently deep, and the arc of maximum swing of the gear 85 on the pivot 81 is sufficiently small, so that there is no disengagement of the gear 85 from the gear 95, and no disadvantageous influence on the efficiency and proper functioning of the gearing.

It will be apparent that the extent to which filter factor is introduced into the mechanism depends upon the extent to which the ring 61 is turned, and this depends on the extent to which the filter mount 33 is turned or twisted. This may be controlled either mechanically or visually. If mechanical control is desired, the camera body is provided with a fixed stop pin 113, and each filter mount is provided with a stop pin or projection 115 in a position to engage with the fixed stop 113 when the filter mount is twisted or rotated relative to the optical axis, when applying it to the camera. Filter mounts having filters of different filter factors have their stops 115 located in different positions, to allow a greater or less degree of rotation of the filter mount (when applying it to the camera) before the stop member 115 engages the fixed stop 113 to prevent further rotation. With such an arrangement, the user applies the filter mount axially to the camera and then twists it as far as possible, until further twisting is prevented by the engagement of the stop 115 with the stop 113. Because of the variable location of the stop 115 depending on the filter factor, filters with a larger filter factor can be turned through a greater angle than those with smaller filter factors, so that the ring 61 turns to a greater extent when a filter with larger filter factor is used, thereby introducing a larger adjustment or allowance into the camera mechanism.

When the filter factor is to be adjusted visually rather than mechanically, this may be done in various ways. For example, each filter mount may be provided with an index mark 121, at a variable position depending upon the filter factor, and the stationary mount 23 on the camera may be provided with a stationary index mark 123. When the filter is applied to the camera, it is twisted until the index mark 121 on the filter comes opposite the index mark 123 on the bayonet mount of the camera. In this form of construction, there is no mechanical stop to prevent further rotation of the filter mount, and reliance is placed upon the intelligence of the user in twisting the filter just far enough to bring the index mark or indication 121 on the filter to a point opposite the reference point or index mark 123 on the camera.

Another form of visual control of the rotation or twisting of the filter, as distinguished from mechanical stop means is shown in FIG. 4, the construction here being the same as in FIG. 3 except for the difference illustrated.

In this construction, the rotary ring 61 is the same as before, except that in addition to its other parts shown in FIG. 3, it also has a radial flange 131 extending circumferentially around part of the periphery of the ring 61, and carrying a series of circumferentially spaced numbers 133 constituting a filter factor scale, a single value of which at a time can be observed through an observation window 135 in the front wall of the camera. In this construction, which is the form at present preferred, when the user applies the filter mount to the camera he twists or turns the mount until the proper filter factor appears in the window 135 of the camera. The filter factor is preferably marked conspicuously on the mount of the filter.

The advantage of the mechanical control of the introduction of the filter factor, as in FIG. 2 and in that form of FIG. 3 in which the pin or stop 115 is employed, is that the operation of introducing the proper filter factor when the filter is applied to the camera is somewhat more certain and less subject to a mistake on the part of an inexperienced photographer. In each of these forms, the photographer simply twists the filter as far as it will go, and the act of doing this will automatically introduce the filter factor into the mechanism. The disadvantage of these forms of construction is that the special filters intended for this use cannot be used on other cameras not equipped with this filter-introducing mechanism, because the presence of the projecting pins 41 (FIG. 2) or 115 (FIG. 3) prevents the filter from being applied to the bayonet mount of the camera, except where the bayonet mount is especially designed with space to receive these projecting pins.

Where the introduction of the filter factor does not depend on mechanical stop means, but depends on the conscious act of the operator in observing the visual indications (turning the filter until the index mark 121 comes opposite the index mark 123, or until the proper filter factor on the scale 133 is visible in the window 135) there is the disadvantage that an inexperienced operator may accidentally set the wrong filter factor in the mechanism, by turning the filter too far, or not far enough. However, against this disadvantage, there is the great advantage that standard conventional filters can be used, and it is not necessary to employ special filters. In the form of construction described in connection with FIG. 3 (but omitting the pin 115) the filter itself is standard or conventional except for the presence of the index mark 121, and this can easily be added to an existing filter, if not already present. In the preferred construction described in connection with FIG. 4, even this mark 121 is not necessary, and the filter can be a standard conventional filter (of the proper size, of course) in every respect, with no change whatever, since the filter factor scale 133 is built into the camera and nothing special is needed on the filter mount itself.

It will be noted especially that in all forms of the invention, there is complete assurance that the filter factor is eliminated automatically whenever the filter is removed from the camera. Even if the operator has incorrectly set the filter factor by turning or twisting the filter mount too far, or not far enough, this does not affect the elimination of the filter factor allowance when the filter is removed. Whatever filter factor was set (regardless of whether it be too much or too little) will be eliminated and the parts will be brought back to a filter factor setting of zero, by the act of twisting the filter mount in a reverse direction to bring the lugs or projections 35 opposite the notches 27 of the bayonet mount so that the filter can be removed from the camera.

The construction is not limited to filters, but may be employed with any interchangeable or detachable components, attachments, or accessories, the presence or absence of which would alter the exposure value for which the camera should be set for given conditions of illumination and film sensitivity.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera of the type having a bayonet mount for detachably receiving a filter mountable on and demountable from the camera by a twisting motion, exposure meter means, and means for introducing a filter factor adjustment into said exposure meter means, characterized by means operated by twisting a filter relative to said bayonet mount for operating said filter factor introducing means.

2. A construction as defined in claim 1, wherein all filters are twisted to the same angular extent when applying them to the camera, and the interengaging means on the camera and the filter are so formed that the same angular extent of twisting of filters with different filter factors will cause different extents of movement of said filter factor introducing means.

3. A construction as defined in claim 1, wherein filters having different filter factors are twisted to different angular extents when applying them to the camera, and wherein the extent of angular twisting of the filter determines the extent of movement of said filter factor introducing means.

4. A construction as defined in claim 3, further including cooperating stop means on the camera and the filter for limiting the extent of angular twisting of the filter in proportion to the filter factor thereof.

5. A construction as defined in claim 3, further including a reference mark in fixed position on the camera, and a cooperating reference mark on the filter to determine the extent to which the filter should be twisted in order to introduce a filter factor appropriate to the particular filter.

6. A construction as defined in claim 3, further including a filter factor scale movably mounted on the camera and operatively coupled to the filter to turn therewith to indicate the filter factor introduced by any particular degree of twisting movement of the filter.

7. A photographic camera having bayonet mounting means for detachably retaining an objective accessory in operative position, said accessory being twisted in one direction relative to said bayonet mounting means to mount the accessory thereon and being twisted in the opposite direction to remove the accessory therefrom, exposure value determining means adjustable to a plurality of different exposure value positions, and means operated by twisting movement of the accessory relative to said bayonet mounting means for adjusting said exposure value determining means.

8. A photographic camera having bayonet mounting means for detachably retaining an objective accessory in operative position, said accessory being twisted in one direction relative to said bayonet mounting means to mount the accessory thereon and being twisted in the opposite direction to remove the accessory therefrom, exposure value determining means adjustable to a plurality of different exposure value positions and including a photocell, movable masking means for variably obstructing passage of light to said photocell, and means operated by twisting movement of said accessory relative to said bayonet mounting means for moving said masking means.

9. A photographic camera having bayonet mounting means for detachably retaining an objective accessory in operative position, said accessory being twisted in one direction relative to said bayonet mounting means to mount the accessory thereon and being twisted in the opposite direction to remove the accessory therefrom, exposure value determining means including meter mechanism, a manually operable setting member for setting said meter mechanism, an intermediate gear operatively interposed between said setting member and said meter mechanism, and means operated by twisting movement of said accessory relative to said bayonet mounting means for moving said intermediate gear.

10. Accessory mounting means for mounting an objective accessory on a photographic camera of the type having exposure value determining means and a movable member for adjusting said exposure value determining means, said accessory mounting means comprising a stationary bayonet mount having a stationary circumferential flange having circumferentially spaced notches therein through which ears on an accessory are adapted to pass when an accessory is to be mounted on said bayonet mount, a ring rotatable within said bayonet mount, means on said ring for engaging an accessory mounted on said bayonet mount to couple said ring to said accessory for joint rotation, and means operatively connecting said ring to said movable adjusting member so that rotation of said ring will move said adjusting member.

11. Accessory mounting means for mounting an objective accessory on a photographic camera of the type having exposure value determining means and a movable member for adjusting said exposure value determining means, said accessory mounting means comprising a stationary bayonet mount having a stationary circumferential flange having circumferentially spaced notches therein through which ears on an accessory are adapted to pass when an accessory is to be mounted on said bayonet mount, a ring rotatable within said bayonet mount, means on said ring for engaging an accessory mounted on said bayonet mount to couple said ring to said accessory for joint rotation, a graduated scale connected to said ring to move therewith, to indicate the extent to which said ring is turned from a predetermined reference position, and means operatively connecting said ring to said movable adjusting member so that rotation of said ring will move said adjusting member.

12. A construction as defined in claim 11, in which said graduated scale is graduated numerically in terms of filter factor.

References Cited in the file of this patent

UNITED STATES PATENTS

| | | |
|---|---|---|
| 1,417,526 | Howell | May 30, 1922 |
| 2,058,562 | Bucky | Oct. 27, 1936 |
| 2,184,017 | Mihalyi | Dec. 19, 1939 |
| 2,620,712 | Clifford | Dec. 9, 1952 |
| 2,975,693 | Ort | Mar. 21, 1961 |
| 2,999,443 | Miyauchi | Sept. 12, 1961 |

UNITED STATES PATENT OFFICE
CERTIFICATE OF CORRECTION

Patent No. 3,099,194                  July 30, 1963

Richard Weiss et al.

It is hereby certified that error appears in the above numbered patent requiring correction and that the said Letters Patent should read as corrected below.

In the grant, line 1, name of second inventor, for "Clauss Prochnow" read -- Claus Prochnow --; in the grant, lines 3 and 14, and in the heading to the printed specification, line 6, for "Apparte" read -- Apparate --.

Signed and sealed this 28th day of January 1964.

(SEAL)
Attest:
ERNEST W. SWIDER

Attesting Officer

EDWIN L. REYNOLDS

Acting Commissioner of Patents